(12) United States Patent  (10) Patent No.: US 8,327,079 B2
Shimizuno et al.  (45) Date of Patent: Dec. 4, 2012

(54) CACHE MEMORY CONTROL DEVICE AND PIPELINE CONTROL METHOD

(75) Inventors: Koken Shimizuno, Kawasaki (JP); Naoya Ishimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 274 days.

(21) Appl. No.: 12/636,523

(22) Filed: Dec. 11, 2009

(65) Prior Publication Data

US 2010/0095068 A1   Apr. 15, 2010

Related U.S. Application Data

(63) Continuation of application No. PCT/JP2007/000660, filed on Jun. 20, 2007.

(51) Int. Cl.
*G06F 12/00* (2006.01)
(52) U.S. Cl. ........................... 711/140; 711/119
(58) Field of Classification Search .................. None
See application file for complete search history.

(56) References Cited

U.S. PATENT DOCUMENTS

| 5,586,296 | A | | 12/1996 | Bernstein et al. |
| 5,590,368 | A | | 12/1996 | Heeb et al. |
| 5,961,632 | A | | 10/1999 | Shiell et al. |
| 6,035,424 | A | * | 3/2000 | Freerksen et al. ............... 714/40 |
| 2006/0143405 | A1 | | 6/2006 | Ishikawa et al. |

FOREIGN PATENT DOCUMENTS

| EP | 0 442 116 A2 | 8/1991 |
| EP | 1 220 090 A1 | 7/2002 |
| JP | 58-99857 | 6/1983 |
| JP | 64-082150 | 3/1989 |
| JP | 2-32436 | 2/1990 |
| JP | 2-189658 | 7/1990 |
| JP | 4-324546 | 11/1992 |
| JP | 6-290107 | 10/1994 |
| JP | 7-56808 | 3/1995 |
| JP | 2735781 | 1/1998 |
| JP | 2001-22578 | 1/2001 |
| JP | 2006-40090 | 2/2006 |
| JP | 2006-185284 | 7/2006 |

OTHER PUBLICATIONS

Notice of Rejection Grounds mailed Jun. 8, 2010 and issued in corresponding Japanese Patent Application 2009-520143.
European Search Report dated Jul. 28, 2011 in corresponding European Patent Application 07790186.6.
Japanese Office Action issued Feb. 8, 2011 in corresponding Japanese Patent Application 2009-520143.

* cited by examiner

*Primary Examiner* — Shawn X Gu
(74) *Attorney, Agent, or Firm* — Fujitsu Patent Center

(57) ABSTRACT

A cache memory control device includes: a determination unit for determining whether or not a command provided from, for example, each core is to access cache memory during the execution of the command; and a path switch unit for putting a command determined as accessing the cache memory in pipeline processing, and outputting a command determined as not accessing the cache memory directly to an external unit without putting the command in the pipeline processing.

11 Claims, 7 Drawing Sheets

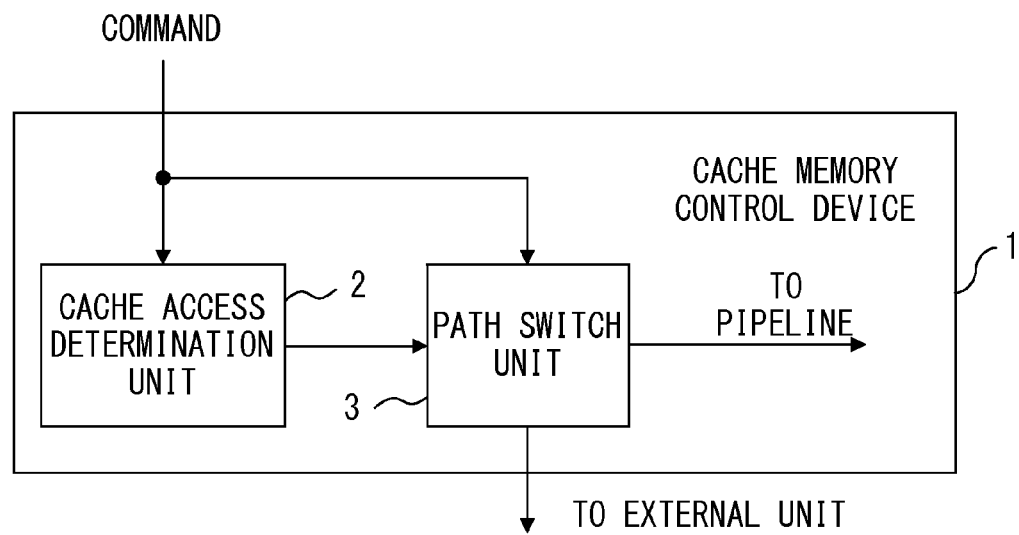
F I G. 2

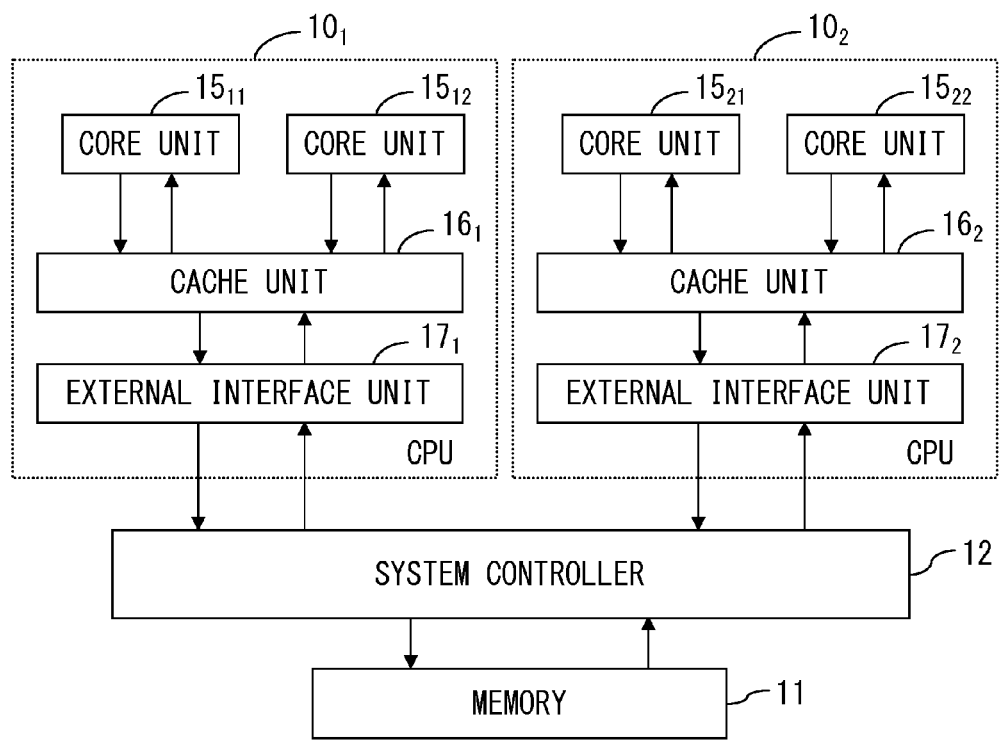
F I G. 3

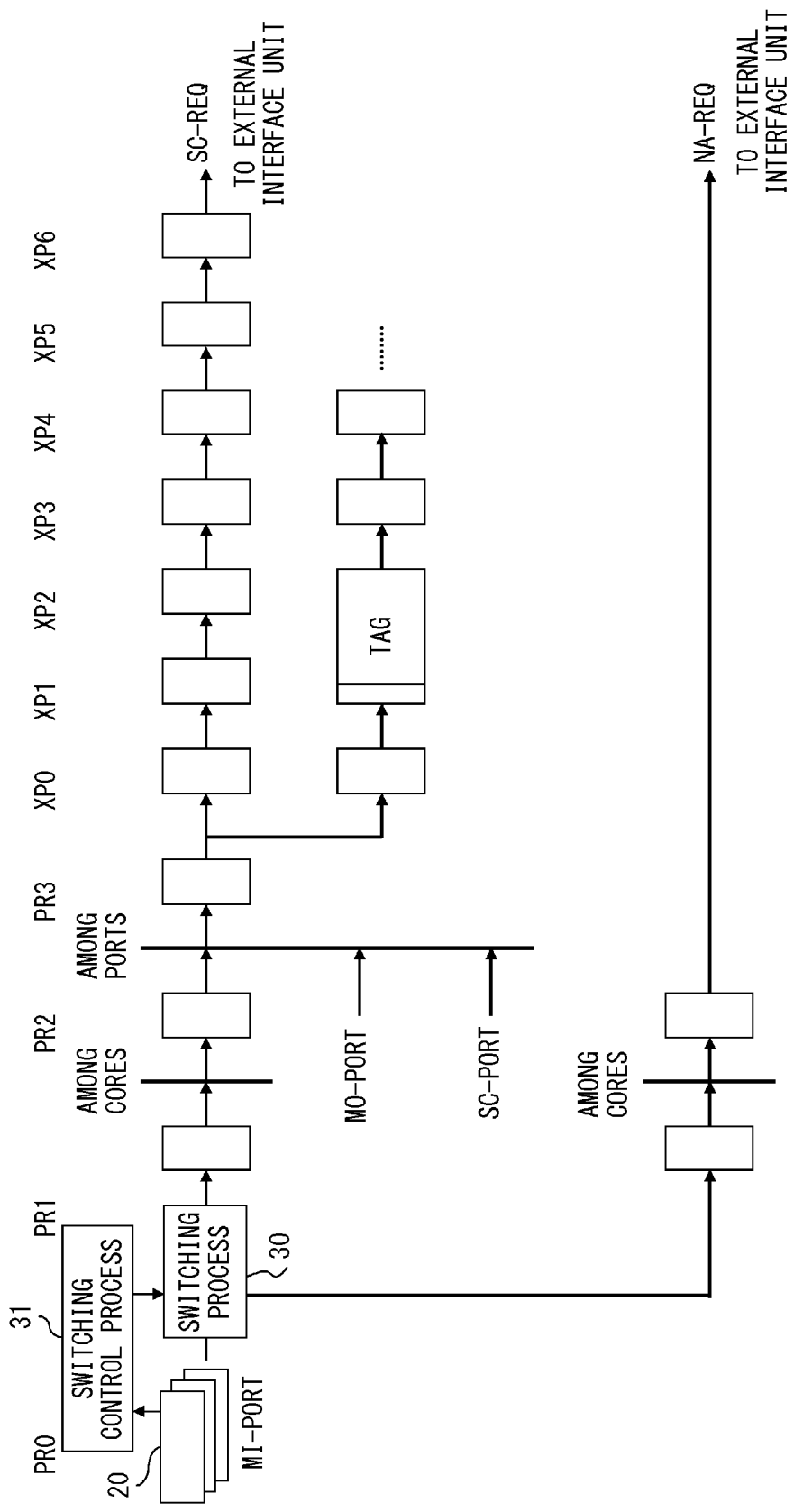
F I G. 5

PHYSICAL NUMBER

| | | | | | |
|---|---|---|---|---|---|
| n | | | | | |
| ⋮ | | | | | |
| 2 | | | | | |
| 1 | | | | | |
| 0 | VLD | CMD | ADRS | REQID | etc |

F I G. 6

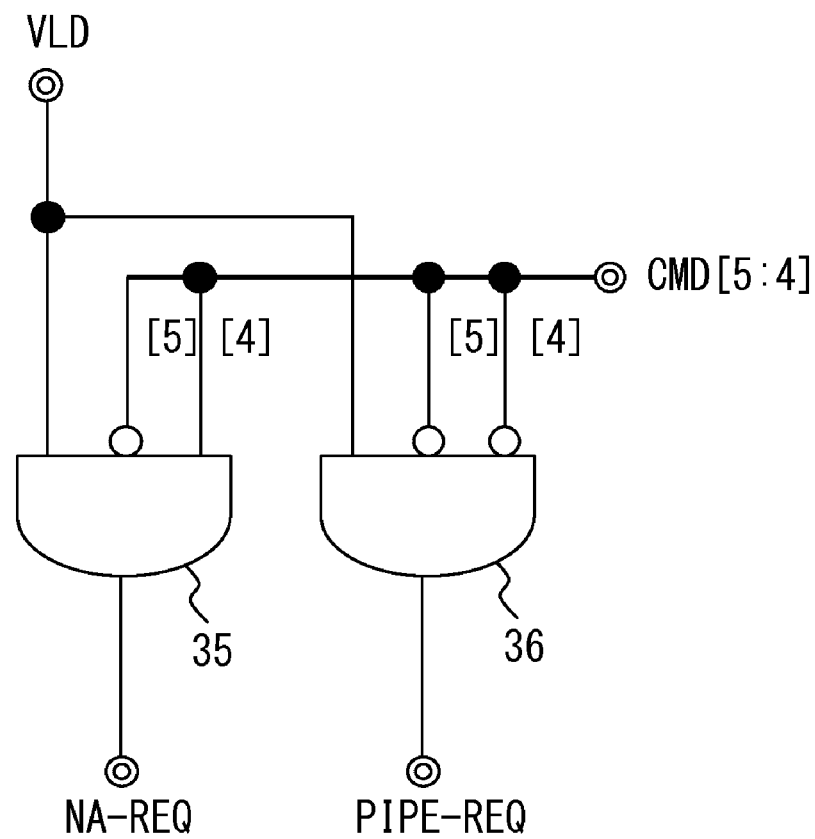
F I G. 7

CACHE MEMORY CONTROL DEVICE AND PIPELINE CONTROL METHOD

CROSS-REFERENCE TO RELATED APPLICATION

This application is a continuation of PCT application of PCT/JP2007/000660, which was filed on Jun. 20, 2007.

FIELD

The present invention relates to a cache memory control system, and more specifically to a cache memory control device and a pipeline control method effective to avoid the congestion of a pipeline in a control device of cache memory in a pipeline processing system.

BACKGROUND

Cache memory has been conventionally used in a computer system. The cache memory may predict that data used by a central processing device (CPU) may be soon used again, for example, and hold the data in high-speed cache memory so that the data can be quickly accessed. The cache memory may therefore overcome the restrictions of the access speed of main memory.

However, computer systems have had multiple cores, and a pipeline processing system has been used as an access system to cache memory. As a result, the congestion of a pipeline has become serious and required a workaround to the reduction of the congestion.

FIG. 1 is an explanatory view of a conventional pipeline control system using a multi-core system. In FIG. 1, an MI (move-in)-PORT is a port for storing a command as a new request transmitted from, for example, each core of the multi-core system. In response to the command stored in the port, the priorities are determined among the commands output from each core at the stage of a PR (priority) 1. Then, at the stage of a PR2, the priorities of commands are determined among other ports, that is, an MO (move-out)-PORT storing a response from a core to cache and move-out data from a core, and an SC-PORT storing an order provided from a system controller (SC). The commands are sequentially put in the stages of the pipeline for access processing from a command having a higher priority, that is, from the XP0 to the XP6. The commands that have passed through the pipeline are output to an external interface unit of the CPU as a request SC-REQ for a system controller.

In the prior art above, in addition to an essential command requiring access to cache memory when the command is executed, a command not requiring access to the cache memory such as a command for a write or a read of data to and from an ASI (address space identify) register has been provided for an external interface unit through a pipeline from the XP0 to the XP6 illustrated in FIG. 1. Accordingly, the more numbers of cores in a multi-core system and commands to be processed, the more problems of the congestion in the pipeline will occur.

Patent document 1 as the prior art relating to the control of cache memory described above discloses a technique of accessing at a high speed a part of an area in main memory specified as a noncache area using no cache memory by switching a bus to a bypass route for providing address and data output from an MPU directly to main memory when an address in a bus is within a predetermined address range.

Next, Patent document 2 discloses a technique of improving a use efficiency of cache memory by checking the value of a frequency of accessing a memory position not in the cache from a processor, executing access to the cache if the value exceeds a threshold, and bypassing the cache if the value does not exceed the threshold.

Patent Document 1: Japanese Laid-open Patent Publication No. 2-32436 "Buffer Storage Device"
Patent Document 2: Japanese Patent Publication No. 2735781 "Cache Memory Control System and Method"

However, the conventional techniques above cannot solve the problem that the congestion in a pipeline largely increases in a multi-core system having an increasing number of cores when all commands including those not accessing cache memory during the execution of commands are to pass through the pipeline for cache memory access.

SUMMARY

The present invention aims at reducing the congestion of a pipeline and improving the system performance by externally bypassing noncache type commands not accessing cache memory during the execution in the commands (for example, the commands may be transmitted from each of a plurality of cores configuring a multi-core system) without using the pipeline for controlling the cache memory.

A cache memory control device according to the present invention controls the pipeline processing for a command that accesses cache memory. The cache memory control device includes at least a cache access determination device and a path switch device.

The cache access determination device determines whether a command provided from an external unit (e.g., each of a plurality of cores configuring a multi-core system) is to access cache memory during the execution. The path switch device puts a command determined as accessing cache memory in the pipeline processing, while the path switch device directly outputs to an external unit a command determined as not accessing the cache memory without putting the command into the pipeline processing.

The pipeline control method according to the present invention is to control the pipeline processing for access to cache memory. As with the cache memory control device described above, it is determined whether an externally provided command is to access cache memory during the execution. A command determined as accessing the cache memory is put in pipeline processing, and a command determined as not accessing the cache memory is directly output to an external unit without being put in the pipeline processing.

As described above, according to the present invention, only a command to access cache memory during the execution is put in pipeline processing in the commands provided from each of the cores configuring, for example, a multi-core system, and a command not to access the cache memory is directly output to an external unit without being put in the pipeline processing.

According to an embodiment of the present invention, the congestion of a pipeline for accessing cache memory can be reduced despite of multiple cores in a multi-core system and a large number of commands provided from each core. The embodiment of the present invention thereby successfully contributes to the improvement of system performance.

BRIEF DESCRIPTION OF DRAWINGS

FIG. 2 is a block diagram of a cache memory control device according to an embodiment of the present invention;

FIG. 3 is a block diagram of the entire view of the multi-core system according to an embodiment of the present invention;

FIG. 5 is an explanatory view of a pipeline control system according to an embodiment of the present invention;

FIG. 6 is an explanatory view of an example of storing data in a move-in port; and FIG. 7 is a circuit chart of an example of a path switch control unit.

DESCRIPTION OF EMBODIMENTS

Figure 1:
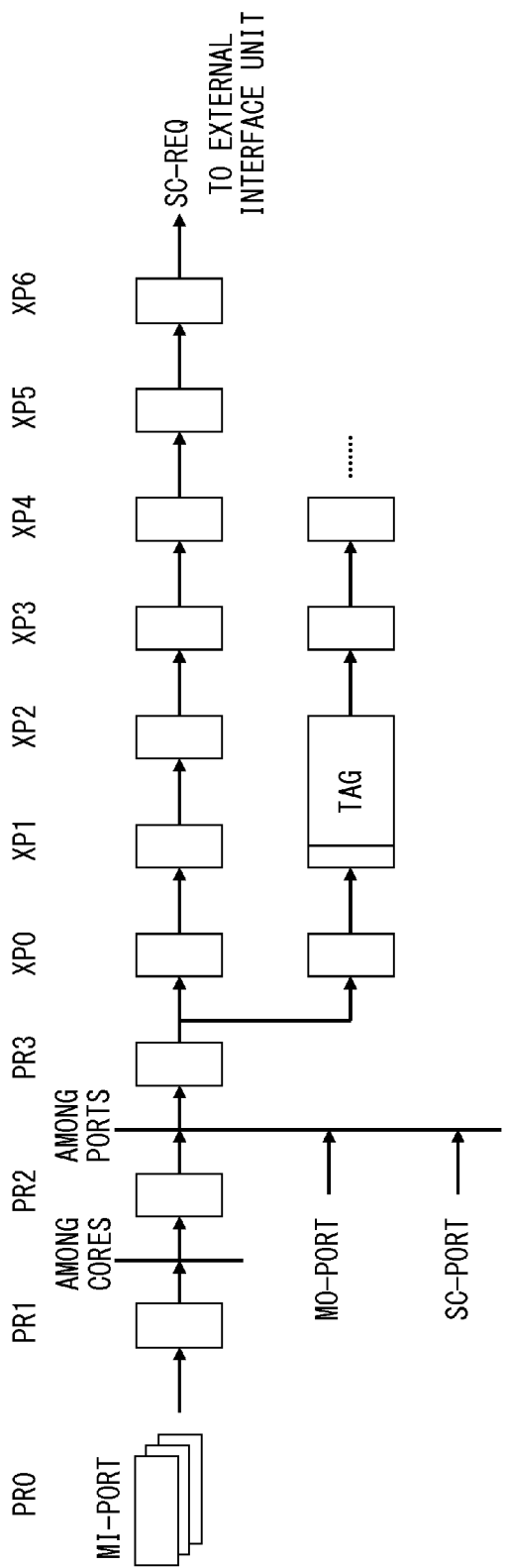
FIG. 1 is an explanatory view of a conventional pipeline control system.

FIG. 2 is a block diagram of the cache memory control device according to an embodiment of the present invention. In FIG. 2, a cache memory control device 1 includes a cache access determination unit 2 and a path switch unit 3.

The cache access determination unit 2 determines whether a command received from an external unit (for example, each of a plurality of cores configuring a multi-core system) is to access cache memory during the execution of the command.

The path switch unit 3 puts a command determined as accessing cache memory in pipeline processing, and outputs a command determined as not accessing the cache memory directly to an external unit without putting the command in a pipeline.

FIG. 3 is a block diagram of an example of a multi-core system. The system illustrated in FIG. 3 is provided with two central processing devices (CPUs), and two CPUs $10_1$ and $10_2$ are connected to memory 11 through a system controller 12. The system controller (SC) 12 controls the communication of requests and data between the two CPUs $10_1$ and $10_2$ and the memory 11. The system controller 12 may also control, for example, an external device not illustrated in the attached drawings.

Each of CPUs $10_1$ and $10_2$ includes two core units 15, a cache unit 16 connected to each core unit 15, and an external interface unit 17 located between the cache unit 16 and the system controller 12, respectively.

Figure 4:
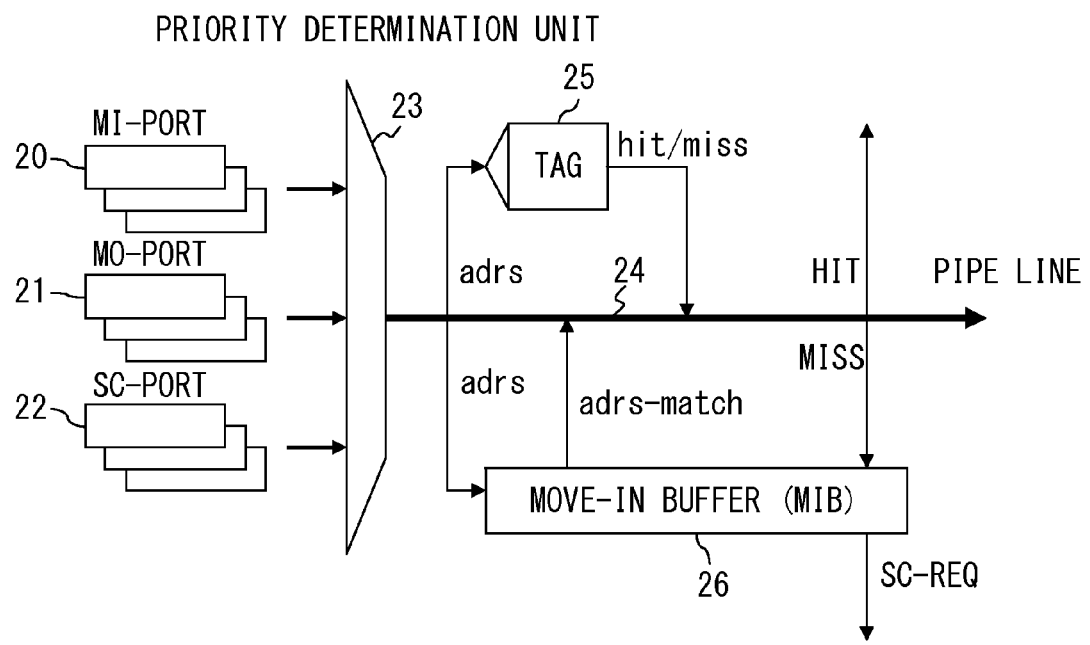
FIG. 4 is a block diagram of a basic view of a cache unit.

FIG. 4 is a block diagram of the cache unit 16 in FIG. 3. In FIG. 4, the cache unit includes three ports, that is, an MI-PORT 20, an MO-PORT 21, and an SC-PORT 22. The cache unit also includes a priority determination unit 23, a pipeline 24, a TAG 25, and a move-in buffer 26. A data unit for holding data, of course, is required as cache memory, but it is omitted in FIG. 4 for clarity.

The priority determination unit 23 in FIG. 4 determines the priorities of the requests (command) stored in the three ports 20, 21, and 22. The priority determination unit 23 then puts the requests from the ports 20, 21, and 22 in the pipeline 24 according to their priorities. The pipeline 24 retrieves a TAG 25 using the address (adrs) of the input request, and returns data requested to the core unit 15 if a hit is found in the cache. On the other hand, it a hit is not found in the cache, an area for storing move-in data is reserved in the move-in buffer 26, and a move-in request, that is, an SC-REQ, is issued to the system controller 12. The pipeline 24 retrieves the data stored in the move-in buffer 26, and provides an address match signal (adrs-match) for the pipeline 24 if a hit is found.

FIG. 5 is an explanatory view of a pipeline control system according to an embodiment of the present invention. In FIG. 5, the PR0 through the PR3 refer to the stages of the processes by the priority determination unit 23. The priorities of the requests (commands) stored in the MI-PORT 20, the MO-PORT 21, and the SC-PORT 22 are determined at each of the process stages.

The XP0 through the XP6 refer to the stages of the pipeline processing for the cache memory access after the PR0 through the PR3. The processing on the pipeline is performed, and the SC-REQ (e.g., from the move-in buffer 26 illustrated in FIG. 4) may be provided for an external interface unit 17 as necessary.

In an embodiment, a request (command) transmitted from the core unit is stored in the MI-PORT 20 in the PR0. From among those requests, the cache type requests for which the cache memory is accessed during the execution may be distinguished from the noncache type requests for which the cache memory is not accessed during the execution. As a result, the paths of the requests may be switched in a switching process 30. The paths of the requests are switched by the control in a switching control process 31 using the data of the commands stored in the MI-PORT 20. The switching process 30 may correspond to, but not limited to, the switch of an address bus, a data bus, etc. as a hardware configuration (circuit). In this embodiment, the flow of the process is mainly described.

A request (command) for which the cache memory is not accessed, in other words, a request (command) having no cache, includes noncache type requests and ASI type requests. A noncache type request uses an area in which data is not transferred to the cache memory in the main memory, that is, a noncache area. A noncache type request can be any of the four types, that is, a noncache read, a noncache write, a noncache block read, or a noncache block write. An ASI type request can be a data write/read request to an ASI (address space identify) register in which a write/read can be performed from software, and can be any of the two types, that is, an ASI read and an ASI write.

The requests for which cache access is not performed are bypassed to a path other than a pipeline for access to the cache memory in the switching process 30. The requests are directly provided for the external interface unit as NA (noncache ASI)-REQs after the priorities of cores are determined at the PR1. On the other hand, for the cache type requests for which the cache memory is accessed during the execution, the priorities are determined among the cores at the PR1 and among the ports at the PR2, and put in the pipelines XP0 through XP6 depending on the priorities. Thus, the requests put in the pipeline can be considerably reduced in the multi-core system, and the congestion in the pipeline can be successfully reduced.

FIGS. 6 and 7 are explanatory views of the switching control process 31 illustrated in FIG. 5. FIG. 6 illustrates the data of the commands (requests) stored in the MI-PORT. The MI-PORT may store the data of the command transmitted from a core unit in each of n+1 entries. The data may include a valid flag (VLD), a command indicating the type of command, an address (ADRS) (e.g., for memory access), an identifier (REQID) of a request, and the like. The CMD includes 6 bits that indicate the type of the command. The upper 2 bits of the 6 bits are "00", the command may be put into the pipeline. If the upper 2 bits are "01", the command may be directly output to the external interface unit without being put in the pipeline.

FIG. 7 is a circuit chart of an example of a path switch control unit corresponding to the switching control process 31 in FIG. 5. In FIG. 7, a switching control unit includes three-input AND gates 35 and 36. The AND gate 35 is provided with the value of the valid flag (VLD) and the upper 2 bits from the 0-th bit in the 6-bit CMD, that is, the values of the 5th bit and the 4th bit. The value of the 5th bit of the CMD is inverted and input to the AND gate 35, and the NA-REQ indicating that the input request to the CMD is to bypass the pipeline processing and is to directly output to the external interface unit is output from the AND gate 35 to the switch corresponding to the switching process 30 in FIG. 5.

On the other hand, the AND gate 36 gets the value of the VLD as is and the inverted values of the 5th bit Thus, the PIPE-REQ indicating that the input request corresponding to the CMD is to be put in the pipeline is output from the AND gate 36 to the switch.

The switch selects and switches a path from which a request is to be output depending on the value of the NA-REQ output from the AND gate 35 or the value of the PIPE-REQ output from the AND gate 36.

Finally described is the effect of the present embodiment. The more number of noncache type commands and ASI type commands, the more effect is provided. For example, when a system is activated, half or more of the commands are non-cache type commands, and the remaining commands include ASI type commands. On the other hand, when an OS is normally activated, most of the commands are cache type commands, but ASI type commands are also included; however, a noncache type command is issued if, for example, an external disk is accessed.

Therefore, when a large number of noncache type commands are issued during the activation of a system, or when access is concentrated on external disks even during the normal activation of an OS, the effect of reducing the congestion of a pipeline can be enhanced.

What is claimed is:

1. A cache memory control device which controls a pipeline processing on a command to access a cache memory, the cache memory control device comprising:
    a cache access determination device that determines whether an externally received command is a command to access the cache memory during execution of the command or a command not to access the cache memory during execution of the command, the command not to access the cache memory being a request for an area in which data is not transferred to the cache memory from a main memory or a request to write/read data to/from an ASI (address space identify) register; and
    a path switch device that switches a path of a command in order to put the command to access the cache memory during execution of the command in the pipeline processing and in order to output the command not to access the cache memory during execution of the command to a system controller via an external interface unit without putting the command in the pipeline processing, the external interface unit located between the cache memory and the system controller, the system controller being a device that controls a communication of requests and data between a CPU and the main memory.

2. The device according to claim 1, wherein
    the cache memory control device is connected to a plurality of cores configuring a multi-core system; and
    the cache access determination device performs a determination in response to a command provided from each of the plurality of cores.

3. The device according to claim 2, wherein
    the cache memory control device determines priorities in directly outputting to the system controller on a plurality of commands output from each of the plurality of cores and determined as commands not to access the cache memory during execution of the commands.

4. The device according to claim 1, wherein
    the cache access determination device decodes a part of data of the externally received command, and performs the determination depending on a result of the decoding.

5. The device according to claim 1, wherein
    the command not to access the cache memory during execution of the command includes a command to write or read data with respect to a register, and a software writes data on the register or reads data from the register.

6. A pipeline control method for cache memory access, the pipeline control method comprising:
    determining whether an externally received command is a command to access the cache memory during execution of the command or a command not to access the cache memory during execution of the command, the command not to access the cache memory being a request for an area in which data is not transferred to the cache memory from a main memory or a request to write/read data to/from an ASI (address space identify) register; and
    putting the command to access the cache memory during execution of the command in a pipeline, and outputting the command not to access the cache memory during execution of the command directly to a system controller via an external interface unit without putting the command in the pipeline processing, the external interface unit located between the cache memory and the system controller, the system controller being a device that controls a communication of requests and data between a CPU and the main memory.

7. The method according to claim 6, wherein
    a pipeline control device for the cache memory access is connected to a plurality of cores configuring a multi-core system; and
    the determining includes a determination in response to a command provided from each of the plurality of cores.

8. The method according to claim 7, wherein
    priorities in directly outputting to the system controller are determined on a plurality of commands not to access the cache memory during execution of the commands, the plurality of commands being output from each of the plurality of cores.

9. An information processing device comprising:
    a memory;
    an arithmetic operation unit that performs an arithmetic process; and
    a cache unit that performs pipeline processing control for access to a cache memory for holding information read from the memory, wherein
    the cache unit comprises:
        a determination unit that determines whether a command is a command to access cache memory during execution of the command or a command not to access cache memory during execution of the command, the command not to access the cache memory being a request for an area in which data is not transferred to the cache memory from a main memory or a request to write/read data to/from an ASI (address space identify) register; and
        a switch unit that switches a path of the command depending on a result of a determination by the determination unit in order to put the command in a pipeline processing if the command is the command to access cache memory, and switches the path of the command to externally output the command to a system controller via an external interface unit without putting the command in the pipeline processing if the command is the command not to access cache memory, the external interface unit located between the cache memory and the system controller, the system controller being a device that controls a communication of requests and data between the arithmetic operation unit and the memory.

10. The device according to claim 9, wherein both the arithmetic operation unit and the cache unit are included in a part of an arithmetic operation device.

11. The device according to claim 9, wherein the cache unit is shared by a plurality of arithmetic operation units.

* * * * *